United States Patent [19]

Castaldi et al.

[11] Patent Number: 4,737,289

[45] Date of Patent: Apr. 12, 1988

[54] PROCESS FOR WASTEWATER TREATMENT

[75] Inventors: Frank J. Castaldi; Timothy W. Trofe; Gordon C. Page; Kevin M. Adams, all of Austin, Tex.

[73] Assignee: Radian Corporation, Austin, Tex.

[21] Appl. No.: 935,235

[22] Filed: Nov. 26, 1986

[51] Int. Cl.$^4$ ................................................ C02F 3/34
[52] U.S. Cl. .................................... 210/611; 210/903; 210/904; 210/719
[58] Field of Search ............... 210/611, 904, 903, 763, 210/719; 435/262

[56] References Cited

U.S. PATENT DOCUMENTS

| 4,508,683 | 4/1985 | Doll et al. ............................ 210/904 |
| 4,530,768 | 7/1985 | Tanihara et al. ...................... 210/904 |
| 4,537,686 | 8/1985 | Borbely et al. ....................... 210/904 |
| 4,615,873 | 10/1986 | Devuyst et al. ...................... 210/763 |

FOREIGN PATENT DOCUMENTS

| 53-78658 | 7/1978 | Japan ................................... 210/719 |
| 55-84598 | 6/1980 | Japan ................................... 210/904 |
| 55-79093 | 6/1980 | Japan ................................... 210/904 |
| 57-21988 | 2/1982 | Japan ................................... 210/904 |
| 60-251985 | 12/1985 | Japan ................................... 210/719 |

OTHER PUBLICATIONS

Ganczarczyk, J. J. et al., "Application of Polysulfide for Pretreatment of Spent Cyanide Liquors"; Jour. W. P. C. F., vol. 57, No. 11, pp. 1089–1093, (1985).

*Primary Examiner*—Benoit Castel
*Attorney, Agent, or Firm*—Stefan J. Klauber

[57] ABSTRACT

Free cyanide-containing wastewater is treated to destroy the free cyanide content thereof by the step of treating said water with sulfur in the form of polysulfide in an integrated process wherein thiocyanate is also eliminated to produce a non-hazardous wastewater effluent and treating the wastewater in a second step with cultures of bacteria of the genus Thiobacillus in combination with nitrifying bacteria which oxidize ammonia to nitrite and nitrite to nitrate. The first step is preferably carried out in the presence of added metallic zinc.

2 Claims, No Drawings

PROCESS FOR WASTEWATER TREATMENT

FIELD OF THE INVENTION

This invention relates to a process for wastewater treatment and is more particularly concerned with the treatment of cyanide-containing wastewaters by chemical and biological means to render the wastewater non-hazardous.

BACKGROUND OF THE INVENTION

One of the most important areas in the development of synthetic fuel plants based on fluidized-bed gasification technology in wastewater treatment, particularly to remove cyanide. The presence of cyanide is also a problem in other wastewaters, including spent cyanide liquors which are obtained as by-products in several different industrial processes. Although they are sometimes produced in relatively small quantities, their storage, transport, treatment, and disposal present considerable hazards and serious technological difficulties. Examples of spent liquors are spent cyanide solutions from electroplating and metal finishing shops and barren bleed solutions from gold and silver extraction operations. Cyanide-containing waste scrub gases are produced in fluid catalytic cracking processes. Cyanide is found in industrial wastewaters from coke manufacturing and iron making and from coal gasification and liquefaction. At present, little specific information is available to explain mechanisms for the formation of cyanide during coal coking or coal conversion, but some experts believe that under conditions existing during coal carbonization and gasification ammonia released from coal may be converted to cyanide. Its production is enhanced by high temperatures and it may be derived to some extent by pyrolysis of nitrogenous products obtained as a result of coal decomposition, such as from pyridine.

A number of methods are known for chemically detoxifying cyanide-containing wastewaters. The most common methods for cyanide removal include chemical oxidation, ion exchange, and precipitation. Chemical oxidation includes a variety of processes of which alkaline chlorination is the most common. In this process, chlorine is introduced into a cyanide-contaminated wastewater with a pH greater than 8.5 in order to effect the oxidation of free cyanide to cyanate. Further oxidation of cyanate to carbon dioxide and nitrogen occurs if chlorine and caustic soda are added in excess of the quantity for the first stage of the complete reaction. It is important that the pH of the solution be maintained above 8.5 in order to prevent the release of toxic cyanogen chloride gas from solution. Free cyanide also can be detroyed by hydrogen peroxide and ozone treatment. Another process uses sulfur dioxide, either as gas or as sulfite solution, in the presence of air and a catalyst to oxidize cyanide to cyanate. The cyanide oxidation reaction is catalyzed by the presence of copper ions in solution. The catalytic effect of copper is not unique to the $SO_2$/air oxidation process. Copper has also shown to improve the kinetics and chemical utilization efficiency during ozonation and hydrogen peroxide treatment of cyanide-containing wastewaters, and to catalyze the oxidation of cyanide on granular activated carbon.

Ferrous iron in the form of ferrous sulfate can be added to a wastewater to convert free cyanide to ferrocyanide. Generally, complexation efficiency increases with increasing pH. However, operation at pH values greater than 9.0 is subject to excessive ferrous hydroxide precipitation. In some instances prussian blue is formed during the reaction. The ferrocyanide is removed from the wastewater by application of selective ion exchange treatment. Poor elution of cyanide complexes from strong base anion resins has resulted in continual loss of capacity through repeated regeneration cycles. In practice, spent regenerant disposal presents a problem because of the possibility that this material may be classified hazardous. Since ion exchange merely concentrates the mass of complexed cyanide in a smaller volume regenerant stream, the process still presents waste disposal problems because of the toxic wastes produced.

Precipitation as a chemical treatment alternative is limited to concentrated cyanide streams. This limitation is due to the solubility of the metal cyanides formed during the precipitation reactions. In general, precipitation alone will not lower the cyanide content in wastewater to a concentration that is acceptable for discharge. The deliberate addition of precipitating agents is not considered a cost effective treatment option because of the toxic sludge that is produced.

The use of polysulfides for treatment of cyanide wastewaters was reported at an early date in Wernlund, U.S. Pat. No. 2,194,438, which was issued Mar. 19, 1940. Polysulfide solutions have not only been used for the treatment of cyanide liquors but have also been used commercially to control cyanide induced corrosion in fluid catalytic crackers and cokers and has been recently adapted to scrub hydrogen cyanide from gases produced in the fluid catalytic cracking process. The use of polysulfides to treat concentrated cyanide solutions from electroplating shops has been reported. It has also been proposed to use polysulfides for treating cyanides present in coal gasification wastewaters. Other typical disclosures of the use of polysulfides are found in *Oil and Gas Journal*, (Apr. 14, 1980), pp. 150–153; *Journal WPCF*, Vol. 57, No. 11, (November, 1985), pp. 1089–1093; *Environmental Science and Technology*, Vol. 13, No. 12, (December 1979), pp. 1481–1487; and *Journal WPCF*, Vol. 51, No. 9, (September 1979), pp. 2267–2282. While the use of polysulfides has been generally successful, there is definite room for improvement in terms of reaction kinetics and conversion efficiency. Moreover, it is necessary to ensure that the wastewaters are converted to a truly non-hazardous condition for discharge into the environment.

It is accordingly an object of this invention to provide a process for the treatment of cyanide-containing liquid effluents to render them non-hazardous which is highly effective, has a high-reaction rate, and has improved efficiency.

It is another object of the invention to provide a process of the character indicated which involves a catalyzed polysulfide treating step.

It is a further object of the invention to provide an improved process for cyanide removal from cyanide containing waste effluents which involves a novel combination of steps leading to improved results.

BRIEF SUMMARY OF THE INVENTION

These and other objects are achieved, in accordance with the invention, by a process which includes, in one aspect, the treatment of the effluents with polysulfide in the presence of low concentrations of added metallic zinc within a relatively narrow pH range of 9.2 to 10.0, preferably 9.2. In its broader aspects, the process of the invention involves the chemical-biological detoxification of cyanide-containing effluents. The process of the invention employs chemical conversion with polysulfide to transform the free cyanide present to thiocyanate, which is then destroyed by the action of certain gram-negative chemolithotropic bacteria that produce ammonia and sulfates by metabolizing thiocyanates. The resultant ammonia is biologically converted to nitrate by the action of a separate family of chemoautotrophic bacteria (Nitrobacteraceae) which are cultured together with the thiocyanate-oxidizing microbes. The process will remove the toxicity associated with cyanide-containing wastewaters by eliminating from the wastes not only cyanide, but also thiocyanate, reduced sulfur species (e.g., sulfide), and thiosulfate and ammonia. The process also permits recovery of the catalyst as part of the overall wastewater treatment system.

DETAILED DESCRIPTION

This process for the detoxification of cyanide-containing wastewater is characterized by the fact that free cyanide in water is converted to thiocyanate with polysulfide in an alkaline medium according to the following general equation:

$$CN^- + S_x-S^{-2} \rightarrow SCN^- + S_{x-1}-S^{-2}.$$

The thiocyanate is then biochemically hydrolyzed to cyanate and sulfide as follows:

$$SCN^- + H_2O \xrightarrow{bacteria} HS^- + HCNO$$

and cyanate is then hydrolyzed further to carbon dioxide and ammonia:

$$HCNO + H_2O \xrightarrow{bacteria} NH_3 + CO_2$$

and sulfide is oxidized to sulfate:

$$HS^- + 2O_2 \rightarrow HSO_4^-.$$

The ammonia is biochemically oxidized to nitrate as follows:

$$NH_4^+ + 2O_2 \xrightarrow{bacteria} NO_3^- + 2H^+ + H_2O,$$

while alkalinity is reduced as follows:

$$2H^+ + 2HCO_3^- \rightarrow 2H_2O + 2CO_2.$$

The reaction of free cyanide with polysulfide to form thiocyanate has been found to be second order overall at pH 9.2. The form of the rate equation is:

$$\frac{d[CN_T]}{dt} = k[CN_T][S_x - S^{-2}]$$

where:
$[CN_T]$ = total free cyanide concentration ($[HCN]+[CN^-]$), moles/liter
$[S_x-S^{-2}]$ = concentration of polysulfide, moles/liter
$k$ = reaction rate constant, liters/mole/min
$(d[CN_T])/dt$ = reaction rate, moles/liter/min The reaction rate declines at pH values less than 9.2 due to reduced polysulfide solubility. At pH values below 9.2, an elemental sulfur-based precipitate will form from polysulfide solutions as the pH is decreased from alkaline to near alkaline conditions.

Experimental observations indicate that the reaction rate constants at 14° C. and 41° C. are 5.36 liters/mole/min and 30.5 liters/mole/min., respectively. Accordingly, it is preferred to carry out the polysulfide treating step of the process wherein the cyanide-containing waste liquid is treated with elemental sulfur, or substances containing sulfur in the polysulfide form, at pH 9.2. However, pH values in the range of 9.2 to 10 also are acceptable. Although elemental sulfur can be employed and is fully effective, it is preferred to use the sulfur in the polysulfide form, e.g., as sodium polysulfide or potassium polysulfide or ammonium polysulfide or calcium polysulfide.

Polysulfide is, of course, a binary compound of sulfur which contains more sulfur than is required by the normal valency of the metal, such as sodium disulfide, sodium trisulfide, sodium tetrasulfide, and sodium pentasulfide and other alkali metal sulfides, as well as alkaline earth metal sulfides, and their ammonium counterparts. Polysulfide as commonly sold commercially, e.g., for purifying cyanide plating solutions, by such manufacturers as DuPont and Moores and Co. is a sodium sulfuret which may contain two or more of the sodium polysulfides and other sulfur compounds and is a well-known article of commerce. Preferably, however, calcium polysulfide is employed. Thus, the applicant's invention comprises treating the cyanide-containing effluents with any polysulfide within the above-indicated pH range, preferably at pH 9.2, and in the presence of low concentrations of metallic zinc. The zinc being added as zinc dust or a water soluble salt such as zinc sulfate or zinc hydroxide and the concentration range for elemental zinc being 10 to 50 mg/L, preferably 10 to 25 mg/L. A zinc cyanide complex is formed during the treatment, but is easily broken down in the presence of excess polysulfide. It has been found that zinc is an ideal catalyst for this reaction because it does not form stable complexes with cyanide, as does copper or nickel, improves both the kinetics and chemical utilization efficiency of the reaction and is less toxic in the environment than copper or nickel should any be discharged with the treated effluents. Cyanide-polysulfide reactions conducted at temperatures between 50° and 80° C., preferably 70° to 80° C., have been employed and found to be fully effective. In the absence of the added metallic zinc, the reaction rate constants are 47% lower and the subsequent reaction times are longer. The zinc cyanide complex, if it forms, and is not broken down by excess polysulfide, is readily decomposed by the addition of lime or soluble sulfides such as sodium sulfide. Most of the zinc is removed from the wastewater by precipitation as zinc sulfide. The removal of zinc during the course of the treatment increases the cyanide to thiocyanate conversion efficiency to the point that free cyanides in the wastewater have been found to be reduced to less than 500 micrograms per liter. The polysulfide employed in the process can be, as mentioned, a known polysulfide such as sodium, potassium, ammonium, or calcium polysulfide. Calcium polysulfide (i.e., commercial lime sulfur solution) has been found to be a less expensive source of polysulfide. On site preparation of calcium polysulfide by reacting calcium hydroxide and elemental sulfur in near boiling water is readily accomplished by mixing in a reactor for half an hour or even less. The preparation can also be effected in less than two hours by mixing at room temperature.

It is a feature of the invention that only moderate amounts of polysulfide are needed, e.g., a polysulfide to cyanate weight ratio of 1:1 to 1.2:1, preferably 1:1, although greater quantities can be employed if desired, as in conventional polysulfide-treating operations, e.g., a polysulfide to cyanide weight ratio up to 4:1.

Zinc is added to the process as commercial zinc dust or zinc sulfate or zinc hydroxide which are readily soluble in water and wastewaters. Any excess zinc is readily recovered by the addition of lime or caustic which precipitates it as a zincate.

The removal of residual sulfide or polysulfide from polysulfide treated wastewaters is accomplished by aeration. Both aqueous sulfides and polysulfides are spontaneously oxidized in the presence of oxygen. The products of the oxidation are primarily thiosulfate, sulfite, and sulfate.

In accordance with the invention, the conversion of the cyanide present in the effluent to thiocyanates is readily effected at an attractive reaction rate and with high efficiency.

In accordance with the invention, the thiocyanates (present in the waste effluents as well as produced by the treatment with polysulfide) are effectively eliminated by treating the reaction product from the above-described effluent-polysulfide-zinc reaction, or from a polysulfide reaction without zinc, by treatment with bacteria of the genus Thiobacillus. The invention thus comprises two aspects. First, the treatment of the undesired cyanide-containing wastewater with polysulfide, preferably in the presence of zinc, to provide a process of improved reaction rate and efficiency and, secondly, the integration of such a process with the above-described biological treatment to provide a total treating process for converting an objectionable noxious cyanide-containing wastewater into an environmentally-acceptable effluent. The two steps, i.e., the chemical treatment with polysulfide and the biological treatment, are carried out in separate reactors by suitable adjustment of temperatures to provide the temperatures indicated and by suitable adjustment of pH, e.g., by adding sodium hydroxide to provide the pH levels discussed above.

The bacteria employed in the biological process of this invention are known commercially and can be isolated from activated sludges treating coke production wastewaters by selective enrichment. While chemoautotrophic bacteria of the genus Thiobacillus are preferred, it will be understood that obligate chemoautotrophic bacteria of this genus can be readily replaced by chemoheterotrophic microbes of the same genus which can be grown with organic substrates as is well known to persons skilled in the art. In like manner bacteria in the genus Nitrosomonas are the preferred ammonia oxidizers and bacteria in the genus Nitrobacter are the preferred nitrite oxidizers, but equivalent ammonia ozidizers well known to the art such as genus Nitrosospira, genus Nitrosococcus, and genus Nitrosolobus can be readily employed as ammonia oxidizers, and genus Nitrospina and genus Nitrococcus can be employed as nitrite oxidizers.

In this biological treatment, thiocyanates serve as both a source of energy and as a source of carbon and nitrogen for bacteria of the genus Thiobacillus. Many of these microorganisms are strict autotrophs and grow best with thiosulfate as the energy source, but thiocyanate, sulfide, and sulfur also can be used for growth. The optimum pH range for thiocyanate degradation by bacteria is between pH 6.7 and 7.2. An alkaline pH tends to inhibit the biodegradation, and temperatures above 37° C. inhibit the growth of Thiobacillus. The temperature range for optimum growth is between 25° C. and 35° C.

The biodegradation of thiocyanate occurs aerobically with carbon dioxide, sulfate, and ammonia produced as metabolites. The bacteria in genera Nitrosomonas and Nitrobacter are aerobic and oxidize ammonia to nitrite and nitrite to nitrate. These microorganisms are autotrophic in that they possess the ability to derive Adenosine Triphosphate from the oxidation of a reduced inorganic compound and use $CO_2$ as their sole source of carbon.

The thiocyanates are eliminated in accordance with the invention by the culturing of obligate autotrophic sulfuroxidizing bacteria (i.e., genus Thiobacillus) with Nitrosomonas species and Nitrobacter species, such that the combined population of microorganisms perform key metabolic functions in tandem in order to achieve thiocyanate degradation and attain simultaneous nitrification in a single biological reactor. The process will achieve the described conversions while producing a relatively small amount of biological sludge which results from its autotrophic nature. Typical sludge yields will be an order of magnitude smaller than a conventional heterotrophic process. Experimental observations with the treatment of synthetic fuels processing wastewaters indicate that the process operates best at a cell residence time in excess of 50 days, i.e., 50-150 days, resulting in a hydraulic residence time of about 15 to 50 hours, and at a neutral pH. Experimental testing with the combined microorganisms population indicates that the nitrifying bacteria should be cultured at mixed liquor temperatures above 10° C. while the thiocyanate bacteria will not sustain growth at temperatures below 6° C. Temperatures above 37° should be avoided.

It has been found that the integrated processing steps of this invention will detoxify cyanide-containing wastewaters by converting total free cyanides ($[HCN]+[CN^-]$) to nitrates and sulfates such that the resultant effluents will be acceptable for discharge to ordinary receiving water environments and/or municipal sewage treatment works.

EXAMPLE 1

A wastewater in the form of an overhead condensate from a steam stripper treating a quench recycle water from a non-tar producing coal gasifier is used as the material to be treated in this example. It has a pH of 7.0 and contains 1000 mg/L ammonia and 260 mg/L cyanide. The pH of the wastewater is adjusted to 9.2 by the addition of sodium hydroxide as a 50 wt% solution in water. The wastewater is treated in a continuous flow stirred tank reactor. There is then added to the influent 2045 mg/L of sodium tetrasulfide (20% excess tetrasulfide was used in the process), and 10 mg/L of metallic zinc in the form of a 30 wt% solution of zinc sulfate. The mixture is agitated within the reactor at a temperature of 70° C. and the hydraulic residence time of the process is 10.7 hours. It is found by conventional analysis that 98% of the detectable free cyanide has disappeared from the effluent of the reactor and the the thiocyanate content of the wastewater is 570 mg/L. Zinc present is removed in a separate vessel as zinc sulfide which is formed from the 20% excess of polysulfide.

The free cyanide released from the zinc-cyanide complex is converted to thiocyanate by the residual polysulfide still in solution resulting in a free cyanide concentration of 0.5 mg/L in the effluent. The remaining excess polysulfide is removed by aeration of the effluent in a separate vessel. Reaction under the same conditions, but in the absence of the added zinc, requires 20.3 hours of hydraulic residence for the reaction to proceed to the same point. If the reaction was conducted at the same temperature using three continuous flow stirred tank reactors operated in series, the same conversion would be achieved in 47 minutes when zinc is added and 89 minutes without zinc.

EXAMPLE 2

The procedure described in Example 1 is repeated, except that the zinc catalyzed reaction is carried out in a continuous flow stirred tank reactor at 80° C. using a hydraulic residence time of 6.3 hours. As in the case of Example 1, the effluent of the process at the end of the treatment is found to contain 0.5 mg/L of free cyanide and 99.8% of the original free cyanide is now in the form of thiocyanate.

EXAMPLE 3

Since it is desirable and preferred that the ammonia content of the wastewater subjected to biological treatment in accordance with the invention be at most 350 mg/L, the treated wastewater from Example 1 is steam stripped to produce a wastewater that contains 180 mg/L ammonia, 579 mg/L thiocyanate, 1795 mg/L biochemical oxygen demand, less than 0.5 mg/L free cyanide, and low levels of residual sulfide. This steam-stripped wastewater has a pH of 8.0 and contains 100 mg/L bicarbonate alkalinity. The wastewater is then treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 40 hours. If the biological reactions were conducted at the same temperature using a mixed liquor volatile suspended solid concentration of 3000 mg/L, the same treatment level would be achieved in 28 hours of hydralic residence time. Since there is a drop in pH with time, the desired pH value of 7.0 is maintained by adding sodium hydroxide as a 50 wt% aqueous solution, as needed. A small amount of phosphorus is added as a 75 wt% solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the biological treatment reactor influent has been consumed and could not be detected by analysis. All reduced sulfur species are now in the form of sulfate.

EXAMPLE 4

Instead of steam stripping to remove excess ammonia, the treated wastewater from Example 1 is diluted by combining it with steam stripped quench recycle water from a non-tar producing coal gasifier producing a wastewater that contains 260 mg/L ammonia, 130 mg/L thiocyanate, 1160 mg/L biochemical oxygen demand, less than 0.5 mg/L free cyanide, and low levels of residual sulfide. This combined wastewater has a pH of 7.5 and contains 500 mg/L bicarbonate alkalinity. The wastewater is treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 24 hours. Since there is a drop in pH with time, the desired pH value of 7.0 is maintained by adding sodium hydroxide as a 50 wt% aqueous solution, as needed. A small amount of phosphorus is added as a 75 wt% solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the reactor influent has been consumed and could not be detected by analysis. All reduced sulfur species are now in the form of sulfate.

EXAMPLE 5

This example shows the application of the biological treatment step in accordance with the invention to a wastewater which has been treated with polysulfide without the use of added zinc.

The wastewater described in Example 1 is treated with polysulfide in accordance with that example, except that the 10 mg/L of metallic zinc is not added, so that a residence time of 20.3 hours is required to achieve the conversion of cyanide to thiocyanate, is steam stripped to produce a wastewater that contains 180 mg/L ammonia, 579 mg/L thiocyanate, 1795 mg/L biochemical oxygen demand, less than 0.5 mg/L free cyanide, and low levels of residual sulfide. This steam-stripped wastewater has a pH of 8.0 and contains 100 mg/L bicarbonate alkalinity. The wastewater is treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 40 hours. Since there is a drop in pH with time, the desired pH value of 7.0 is maintained by adding sodium hydroxide as a 50 wt% aqueous solution, as needed. A small amount of phosphorus is added as a 75 wt% solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the biological treatment reactor influent has been consumed and could not be detected by analysis. All reduced sulfur species are now in the form of sulfate.

Overall, the absence of zinc from the process has the effect of increasing the hydraulic residence time required to achieve the conversion of cyanide to thiocyanate. However, the absence of zinc will not adversely impact the performance of the biological treatment step.

We claim:

1. An integrated process for treating a wastewater containing free cyanide to convert said cyanide to thiocyanate and to eliminate said thiocyanate to produce a nonhazardous wastewater effluent which comprises the steps of treating a wastewater containing free cyanide with sulfur in the form of polysulfide at a pH in the range of 9.2 to 10, in a weight ratio of polysulfide to cyanide ranging from 1:1 to 4:1, thereafter adjusting the pH to a range of 6.7 to 7.2 and treating the resultant wastewater with a treating agent consisting essentially of cultures of bacteria of the genus Thiobacillus in combination with nitrifying bacteria which oxidize ammonia to nitrite and nitrite to nitrate.

2. A process as defined in claim 1, wherein the nitrifying bacteria comprise the family of chemoautotrophic bacteria, Nitrobacteraceae.

* * * * *

UNITED STATES PATENT AND TRADEMARK OFFICE
CERTIFICATE OF CORRECTION

PATENT NO. : 4,737,289

DATED : April 12, 1988

INVENTOR(S) : Frank J. Castaldi, Timothy W. Trofe, Gordon C. Page, and Kevin M. Adams It is certified that error appears in the above-identified patent and that said Letters Patent is hereby corrected as shown below:

At column 1, line 14, change "in" to -- is --.

At column 5, line 6, change "cyanate" to -- cyanide --.

At column 7, line 46, change "hydralic" to -- hydraulic --.

Signed and Sealed this

Fifteenth Day of November, 1988

Attest:

DONALD J. QUIGG

Attesting Officer     Commissioner of Patents and Trademarks